(12) United States Patent
Sparrow et al.

(10) Patent No.: US 11,505,484 B2
(45) Date of Patent: Nov. 22, 2022

(54) METHOD AND SYSTEM FOR TREATING SALTWATER CONTAINING VOLATILE COMPOUNDS

(71) Applicant: Saltworks Technologies, Inc., Richmond (CA)

(72) Inventors: Benjamin Sparrow, Richmond (CA); Henry Tsin, Richmond (CA)

(73) Assignee: SALTWORKS TECHNOLOGIES INC., Richmond (CA)

(*) Notice: Subject to any disclaimer, the term of this patent is extended or adjusted under 35 U.S.C. 154(b) by 120 days.

(21) Appl. No.: 17/272,220

(22) PCT Filed: Feb. 6, 2020

(86) PCT No.: PCT/CA2020/050152
§ 371 (c)(1),
(2) Date: Feb. 26, 2021

(87) PCT Pub. No.: WO2020/160669
PCT Pub. Date: Aug. 13, 2020

(65) Prior Publication Data
US 2021/0309550 A1 Oct. 7, 2021

Related U.S. Application Data

(60) Provisional application No. 62/801,754, filed on Feb. 6, 2019.

(51) Int. Cl.
*C02F 9/00* (2006.01)
*B01D 5/00* (2006.01)
(Continued)

(52) U.S. Cl.
CPC .............. *C02F 9/00* (2013.01); *B01D 5/006* (2013.01); *C02F 1/043* (2013.01); *C02F 1/16* (2013.01);
(Continued)

(58) Field of Classification Search
USPC .............................. 210/610; 159/23; 203/10
See application file for complete search history.

(56) References Cited

U.S. PATENT DOCUMENTS 5,126,050 A 6/1992 Irvine et al.
5,205,906 A * 4/1993 Grutsch ................. B01D 53/86
159/901

(Continued)

FOREIGN PATENT DOCUMENTS

GB 2084486 A 4/1982

OTHER PUBLICATIONS

International Search Report and Written Opinion dated Apr. 16, 2020, issued by the Canadian Intellectual Property Office in connection with PCT Application No. PCT/CA2020/050152, filed Feb. 6, 2020, 10 pages.

*Primary Examiner* — Nina Bhat
(74) *Attorney, Agent, or Firm* — Tarolli, Sundheim, Covell & Tummino LLP

(57) ABSTRACT

A method and system for treating and purifying saltwater contaminated by volatile compounds. The saltwater is evaporated resulting in a gas composed of water vapor and gaseous volatile compounds. The gas is condensed into a condensate containing the contaminated volatile compounds which is biologically treated to remove the volatile compounds thereby producing purified water. The latent heat released by condensing is used to evaporate the purified water into the atmosphere in an energy efficient manner.

28 Claims, 3 Drawing Sheets

(51) Int. Cl.
*C02F 1/04* (2006.01)
*C02F 1/16* (2006.01)
*C02F 1/28* (2006.01)
*C02F 1/44* (2006.01)
*C02F 1/66* (2006.01)
*C02F 3/12* (2006.01)
*C02F 101/16* (2006.01)
*C02F 101/32* (2006.01)
*C02F 103/08* (2006.01)

(52) U.S. Cl.
CPC .............. *C02F 1/283* (2013.01); *C02F 1/444* (2013.01); *C02F 1/66* (2013.01); *C02F 3/12* (2013.01); *C02F 2101/16* (2013.01); *C02F 2101/322* (2013.01); *C02F 2103/08* (2013.01); *C02F 2303/10* (2013.01); *C02F 2305/06* (2013.01)

(56) References Cited

U.S. PATENT DOCUMENTS

| | | | |
|---|---|---|---|
| 8,778,037 B2* | 7/2014 | Shaw | B01D 53/40 |
| | | | 48/197 R |
| 9,794,612 B1 | 10/2017 | Lam et al. | |
| 10,752,523 B2* | 8/2020 | Bower | B01D 71/36 |
| 2009/0294074 A1* | 12/2009 | Forstmanis | B01D 1/305 |
| | | | 159/47.3 |
| 2010/0219372 A1* | 9/2010 | Hook | C01D 3/14 |
| | | | 205/687 |
| 2012/0267307 A1* | 10/2012 | McGinnis | C02F 1/445 |
| | | | 210/321.64 |
| 2016/0039683 A1* | 2/2016 | Sparrow | B01D 1/26 |
| | | | 202/168 |
| 2016/0075579 A1* | 3/2016 | Lea | C02F 3/1268 |
| | | | 203/10 |
| 2019/0060834 A1* | 2/2019 | Katz | C02F 9/00 |

\* cited by examiner

METHOD AND SYSTEM FOR TREATING SALTWATER CONTAINING VOLATILE COMPOUNDS

RELATED APPLICATIONS

The present invention is a U.S. National Stage under 35 USC 371 patent application, claiming priority to Serial No. PCT/CA2020/050152, filed on 6 Feb. 2020; which claims priority of U.S. Provisional Application Ser. No. 62/801,754, filed on 6 Feb. 2019, the entirety of both of which are incorporated herein by reference.

TECHNICAL FIELD

This present disclosure is directed at systems, processes, and techniques for treating a saltwater containing one or more volatile compounds.

BACKGROUND

Saltwaters with a high concentration (e.g., >60,000 mg/L) of total dissolved contents are generally prohibited from direct surface discharge. Example high salinity saltwaters include concentrated brines generated as a byproduct of reverse osmosis (RO), flue gas desulfurization wastewaters, and flowback and produced water generated as a byproduct of oil or gas production. Managing these high salinity saltwaters is a challenge for industry. RO concentrated brines generated as a byproduct of seawater desalination are currently discharged into the ocean, disrupting the salinity of the neighboring marine environment and possibly polluting the ocean with RO pretreatment chemicals.

However, it is not feasible to discharge RO concentrated brines generated from inland brackish water desalination into the ocean. Additionally, in the oil and gas industry, only a small portion of flowback and produced water may be reused for subsequent oil/gas extraction; most flowback and produced water are disposed of in a large evaporation pond or by injecting them into an underground disposal well, raising environmental and social concerns. Minimum liquid discharge (MLD) or zero liquid discharge (ZLD) desalination technologies, which often use thermal energy to evaporate water and to reduce or eliminate the volume of a saltwater, have been used as alternative options to dispose of high salinity saltwaters.

SUMMARY

According to a first aspect, there is provided a process for treating a saltwater containing volatile compounds, the process comprising: evaporating the saltwater to produce a concentrated brine having a salt concentration higher than the saltwater and a first gaseous stream comprising water vapor and gaseous volatile compounds; condensing at least some of the water vapor and gaseous volatile compounds to produce a contaminated condensate and to release a latent heat of condensation; biologically removing at least some of the volatile compounds from the contaminated condensate to produce a purified water with a lower concentration of the volatile compounds than the contaminated condensate; heating the purified water using at least some of the latent heat; and evaporating at least some of the heated purified water to produce a second gaseous stream.

The process may further comprise discharging into the atmosphere the second gaseous stream.

The process may further comprise filtering the purified water. The filtering may comprise applying at least one of microfiltration and ultrafiltration without applying reverse osmosis.

The process may further comprise polishing the purified water using an activated carbon unit.

The process may further comprise heating at least one of the saltwater and the purified water by transferring at least some sensible heat from the contaminated condensate to the at least one of the saltwater and the purified water such that the contaminated condensate is cooled to a temperature below 40° C. before the at least some of the volatile compounds are biologically removed from the contaminated condensate.

At least some of the sensible heat and latent heat may be used to heat and evaporate at least some of the purified water.

The volatile compounds may comprise volatile organic compounds and ammonia.

The evaporating to produce the first gaseous stream may evaporates less than 15% of the ammonia and at least 80% of the volatile organic compounds of the saltwater into the first gaseous stream.

The process may further comprise adjusting the pH of the saltwater such that the pH is in a range of 3.5 to 7.0 during the evaporating of the saltwater.

The process may further comprise maintaining a preset biodegradation capacity of a biological treatment unit used to biologically remove the volatile compounds by supplying an organic compound to the biological treatment unit.

The biological removing of the volatile compounds may be performed aerobically.

The evaporating of the saltwater may be performed using a humidifier unit and the condensing may be performed using a dehumidifier unit.

The process may further comprise supplying a carrier gas to the humidifier unit while the humidifier unit is used to evaporate the saltwater to produce the first gaseous stream.

The condensing of the first gaseous stream in the dehumidifier unit may produce an at least partially dehumidified carrier gas.

The process may further comprise re-using at least some of the at least partially dehumidified carrier gas produced by the dehumidifier unit as the carrier gas for the humidifier unit.

According to another aspect, there is provided a system for treating a saltwater containing volatile compounds, the system comprising: a first evaporation unit to receive the saltwater and configured to evaporate the saltwater to produce a concentrated brine having a salt concentration higher than the saltwater and a first gaseous stream comprising water vapor and gaseous volatile compounds; a condenser fluidly coupled to the first evaporation unit to receive the first gaseous stream and configured to condense at least some of the water vapor and gaseous volatile compounds to produce a contaminated condensate and to release a latent heat of condensation; a biological treatment unit fluidly coupled to the condenser to receive the contaminated condensate and configured to remove at least some of the volatile compounds from the contaminated condensate to produce a purified water with a lower concentration of the volatile compounds than the contaminated condensate; and a second evaporation unit fluidly coupled to the biological treatment unit to receive the purified water and thermally coupled to the condenser such that at least some of the latent heat is transferred into and used to evaporate at least some of the purified water to produce a second gaseous stream.

The condenser may comprise a first heat exchanger to which the second evaporation unit is thermally coupled.

The biological treatment unit may comprise at least one of an activated sludge reactor, a moving bed biofilm reactor, and a membrane bioreactor.

The second evaporation unit may be an evaporative cooling tower.

The system may further comprise a second heat exchanger fluidly coupled to the first evaporation unit and the condenser. The second heat exchanger may be configured to receive the saltwater and the contaminated condensate and transfer sensible heat from the contaminated condensate to the saltwater such that the contaminated condensate is cooled to a temperature below 40° C. prior to entering the biological treatment unit.

The system may further comprise a solids management unit fluidly coupled to the first evaporation unit to receive the concentrated brine and configured to separate from the concentrated brine at least some solids generated during evaporating of the saltwater.

The system may further comprise a filter unit fluidly coupled to the biological treatment unit and the second evaporation unit and configured to filter the purified water entering the second evaporation unit by applying at least one of microfiltration and ultrafiltration without applying reverse osmosis unit.

The system may further comprise an activated carbon unit fluidly coupled to the filter unit and the second evaporation unit and configured to remove residual volatile organic compounds in the purified water entering the second evaporation unit.

The first evaporation unit and the condenser may comprise a humidifier unit and a dehumidifier unit, respectively.

The humidifier unit may comprise a packing with a surface material comprising one or more of ethylene-tetrafluoroethylene copolymer, fluorinated ethylene-propylene, perfluoroalkoxy polymer, and polytetrafluoroethylene.

The humidifier unit may be configured to receive a carrier gas and to facilitate evaporation of the saltwater into the carrier gas to produce the first gaseous stream.

The dehumidifier unit may be configured to condense at least some water and at least some of the volatile compounds in the first gaseous stream to produce an at least partially dehumidified carrier gas.

The system may further comprise a gas circulation conduit fluidly coupling an outlet of the dehumidifier unit and an inlet of the humidifier unit for circulating the at least partially dehumidified carrier gas from the dehumidifier unit to the humidifier unit for re-use as the carrier gas.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

For purposes of clarity, not every component is labeled, nor is every component of each embodiment shown where illustration is not necessary or desirable to allow those of ordinary skill in the art to understand the embodiments being described.

DETAILED DESCRIPTION

When thermal energy is used for desalination, such as when applying MLD or ZLD technologies, it can be economically and environmentally beneficial to use that thermal energy efficiently. In at least some example embodiments herein, a hybridized desalination system comprising thermal energy-based evaporation units and a biological treatment unit is used to evaporatively dispose of a saltwater contaminated with volatile compounds. At least some example embodiments provide systems and methods to treat a saltwater contaminated with volatile compounds and to reduce, minimize, or eliminate the volume of saltwater disposed of without creating an issue regarding how to manage substantial liquid water byproduct, and without emitting substantial amounts of volatile compounds into the air.

The saltwater treatment system comprises a thermal energy-based desalination system that uses a first evaporation unit to evaporate the saltwater (i.e., at least some of the water and at least some of volatile compounds in the saltwater are evaporated to respectively result in water vapor and evaporated/gaseous volatile compounds), and a biological treatment unit that uses microbes to remove the volatile compounds before disposing of the water vapor into the air. The volatile compounds comprise at least one of an ammonia compound and volatile organic compounds (e.g., methanol and BTEX compounds [benzene, toluene, ethylbenzene, and xylene]). As discussed in further detail below, at least some example embodiments are technically beneficial in that they use thermal energy in the water vapor resulting from the saltwater's evaporation is one phase of the desalination process to evaporate liquid water byproduct in a later phase of the desalination process, thereby efficiently using that thermal energy to dispose of the liquid water byproduct while preventing volatile compounds from being released into the air.

Figure 1:
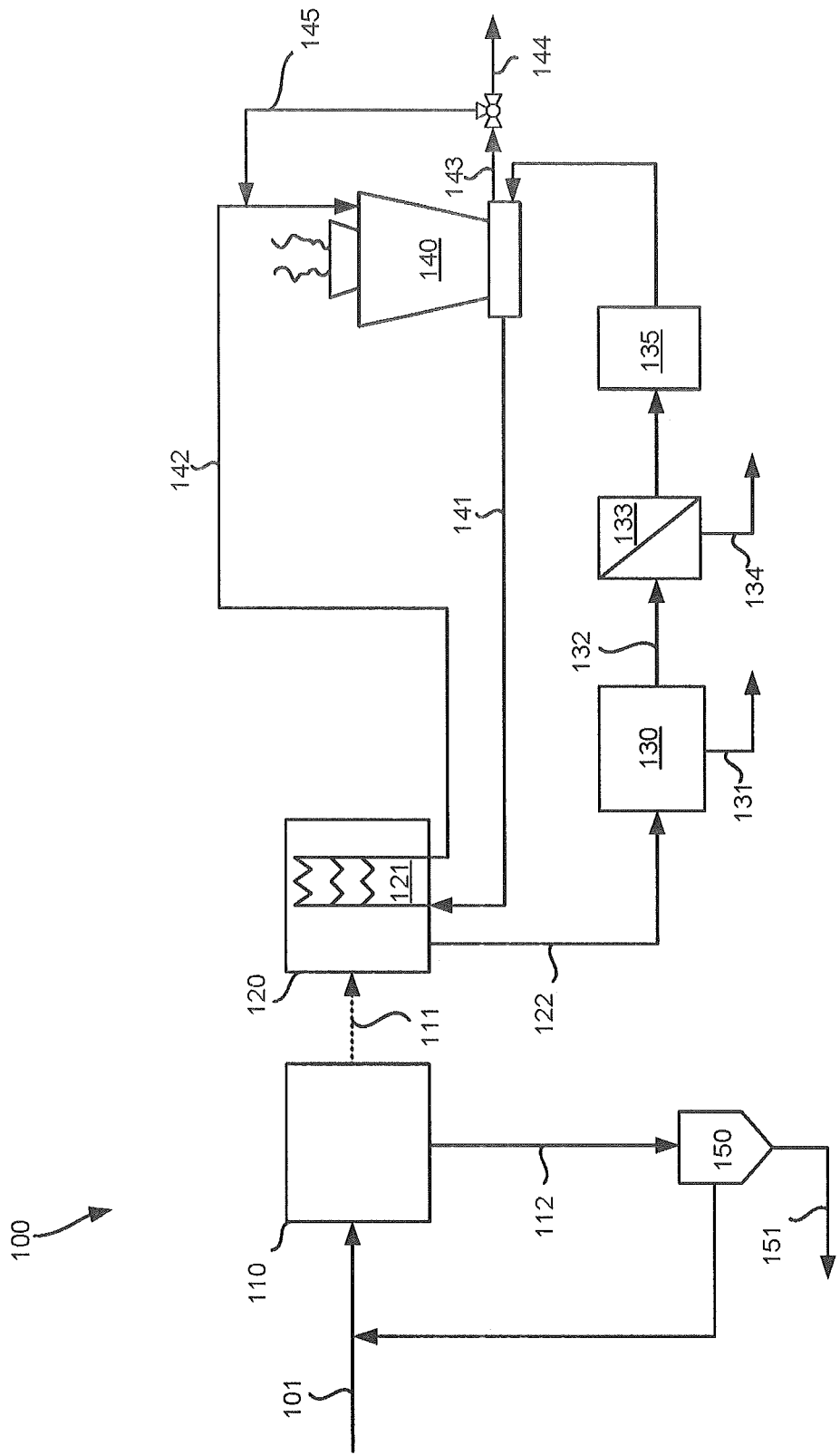
FIGS. 1 and 2 are schematic illustrations of example saltwater treatment systems, which can be used to evaporatively dispose of a saltwater contaminated with volatile compounds, according to example embodiments.

Turning now to FIG. 1, there is shown schematically an example embodiment of a saltwater treatment system 100, which may be used to evaporatively dispose of a saltwater contaminated with volatile compounds. The saltwater treatment system 100 comprises:

(a) a first evaporation unit 110 to receive the saltwater via conduit 101 and configured to evaporate the saltwater to produce a concentrated brine having a salt concentration higher than the saltwater and a first gaseous stream comprising water vapor and gaseous volatile compounds;

(b) a condenser 120 fluidly coupled to the first evaporation unit via a conduit 111 to receive the first gaseous stream and configured to condense at some of the water vapor and gaseous volatile compounds to produce a contaminated condensate and to release a latent heat of condensation;

(c) a biological treatment unit 130 fluidly coupled to the condenser 120 via conduit 122 to receive the contaminated condensate and configured to remove at least some of the volatile compounds from the contaminated condensate to produce a purified water with a lower concentration of the volatile compounds than the contaminated condensate; and (d) a second evaporation unit 140 fluidly coupled to the biological treatment unit 130 to receive the purified water and thermally coupled to the condenser 120 via conduits 141 and 142 such that at least some of the latent heat is transferred into and used to evaporate at least some of the purified water to produce a second gaseous stream. As discussed further below, in FIG. 1 the second evaporation unit 140 is indirectly fluidly coupled to the biological treatment unit 130; in at least some other example embodiments, the biological treatment unit 130 and the second evaporation unit 140 may be directly fluidly coupled.

The saltwater treatment system 100 of FIG. 1 further comprises a solids management unit 150 fluidly coupled to the first evaporation unit 110 via conduit 112 to receive the concentrated brine and to separate from the concentrated brine at least some solids generated during evaporating the saltwater; a filter unit 133 downstream of the biological treatment unit 130 and fluidly coupled to the biological treatment unit 130 via conduit 132 to filter the purified water; and an activated carbon unit 135 downstream of the filter unit 133 and fluidly coupled to the filter unit 133 to remove any residual volatile organic compounds in the filtered and purified water before the purified water enters the second evaporation unit 140.

In at least some example embodiments (not depicted), the saltwater treatment system 100 further comprises a second activated carbon unit upstream of the biological treatment unit 130 to remove at least some of volatile compounds in the contaminated condensate before the contaminated condensate is purified using the biological treatment unit 130.

As depicted in FIG. 1, the condenser 120 comprises a first heat exchanger 121 that facilitates the latent heat transfer between the second evaporation unit 140 and the condenser 120. A first portion of the first heat exchanger 121 receives the first gaseous stream and a second portion of the first heat exchanger 121 receives the purified water. The first heat exchanger 121 transfers at least some of the latent heat of condensation from its first portion into its second portion, thereby transferring that heat into the purified water. The first heat exchanger 121 also transfers at least some sensible heat from the contaminated condensate into the purified water. For example, the first heat exchanger 121 may comprise a conduit manufactured from a heat-conductive material (e.g., titanium) with the purified water flowing through it. The first portion of the first heat exchanger 121 may comprise the outside of that conduit on which the contaminated condensate condenses from the first gaseous stream, and the second portion of the first heat exchanger 121 may comprise the interior of that conduit through which the purified water flows.

The first evaporation unit 110 and the condenser 120 shown in FIG. 1 are presented as separated units in fluid communication through the conduit 111. In at least some other example embodiments (not shown), the first evaporation unit 110 and the condenser 120 may be fluidly coupled in other suitable ways. For example, the first evaporation unit 110 and the condenser 120 may be constructed within a modular container (e.g., a shipping container), and the conduit 111 may comprise ducting contained within the modular container. As another example, the first evaporation unit 110 and the condenser 120 may be constructed within a modular container and the system 100 may lack any discrete conduit 111 connecting the first evaporation unit 110 and the condenser 120 together. For example, the first evaporation unit 110 and the condenser 120 may be separated by an internal wall and fluidly coupled through an opening in the internal wall.

In at least some example embodiments, the biological treatment unit 130 comprises any one or more of, or is selected from a group consisting of, an activated sludge reactor, a moving bed biofilm reactor, and a membrane bioreactor. The biological treatment unit 130 uses microbes to remove volatile compounds in the contaminated condensate, resulting in what is referred to as "purified water" herein. The microbes may be present as an activated sludge, on suspended growth media, and/or on supported media. The microbes remove at least some of the volatile organic compounds via an aerobic biodegradation process, which relies on the use of oxygen. The aerobic biodegradation converts volatile organic compounds into carbon dioxide that is released into the atmosphere. The amount of volatile organic compounds in the contaminated condensate may be measured in terms of chemical oxygen demand (COD), which corresponds to the amount of oxygen needed to oxidize organic compounds in the contaminated condensate.

In at least some example embodiments, the filter unit 133 comprises a microfiltration unit and an ultrafiltration unit, and excludes an RO unit. While an RO membrane is effective for removal of total dissolved solids, it is not effective for removal of volatile organic compounds such as methanol and BTEX compounds. The purified water from the biological treatment unit 130 is substantially salt free (e.g., with less than 1,000 mg/L of total dissolved solids). An RO filtration unit in such example embodiments is accordingly unnecessary.

In at least some example embodiments, the second evaporation unit 140 is an evaporative cooling tower that discharges the second gaseous stream into the atmosphere. At least some of the latent heat and at least some of the sensible heat transferred into the purified water are dissipated out of the system 100 through evaporating the purified water.

In at least some example embodiments, the solids management unit 150 comprises one or more of a solids filtration unit, a solids clarification unit, a hydrocyclone, and a crystallizer.

In at least some example embodiments, a process of using the system 100 for treating a saltwater containing volatile compounds comprises:
  (a) evaporating, using the first evaporation unit 110, the saltwater to produce a concentrated brine having a salt concentration higher than the saltwater and a first gaseous stream comprising water vapor and gaseous volatile compounds;
  (b) condensing, using the condenser 120, at least some of the water vapor and gaseous volatile compounds to produce a contaminated condensate and to release a latent heat of condensation;
  (c) biologically removing, using the biological treatment unit 130, at least some of the volatile compounds from the contaminated condensate to produce a purified water with a lower concentration of the volatile compounds than the contaminated condensate;
  (d) heating, using the first heat exchanger 121, the purified water using at least some of the latent heat; and
  (e) evaporating, using the second evaporator 140, at least some of the heated purified water to produce a second gaseous stream.

In operation, the saltwater is directed via conduit 101 into the first evaporation unit 110. The saltwater may be a flowback and/or a produced water generated during oil or natural gas production. The saltwater comprises elevated levels of dissolved salts (e.g., >100,000 mg/L) and volatile compound contaminants, such as nitrogen compounds (e.g., ammonia) and/or volatile organic compounds (e.g., methanol and BTEX compounds). Before entering the system 100, the saltwater may be pretreated by pretreatment processes (not shown in FIG. 1) to remove at least some suspended solids, greases, and/or oils. The pretreatment may include any one or more of media filtration, microfiltration, ultrafiltration, coagulation, flocculation, gas flotation, clarification, and sedimentation.

The concentrated brine generated in the first evaporation unit 110 is directed via conduit 112 to the solids management unit 150. The solids management unit 150 separates from the concentrated brine solids, such as salt solids, generated from the evaporation of saltwater in the first evaporation unit 110. The separated solids are discharged from the solids management unit 150 via conduit 151 and consequently exit the system 100. As shown in FIG. 1, the concentrated brine may be recirculated back to the first evaporation unit 110 for further evaporation. When the content of total dissolved solids in the concentrated brine reaches a preset value, such as 350,000 mg/L, the concentrated brine may be blown down out of the system 100 via conduit 151.

The first gaseous stream resulting from evaporating the saltwater in the first evaporation unit 110 is directed via conduit 111 to the condenser 120. The volatile compounds-contaminated condensate produced in the condenser 120 is directed via conduit 122 to the biological treatment unit 130. The biological treatment unit 130 uses microbes to remove volatile compounds in the contaminated condensate via an aerobic biodegradation process. Aerobic biodegradation converts volatile organic compounds into carbon dioxide, which is released into the air. Biomass is also generated during the aerobic biodegradation of volatile organic compounds and is discharged via conduit 131 out of the system 100. The purified water from the biological treatment unit 130 is directed via conduit 132 to the filter unit 133. Any residual biomass particles in the purified water are filtered by the filter unit 133 and discharged via conduit 134 out the system 100. The filtered and purified water is directed from the filter unit 133 to the activated carbon unit 135, which polishes any residual volatile organic compounds in the purified water.

In the embodiment shown in FIG. 1, the first gaseous stream flows through the first portion of the first heat exchanger 121 and at least some of the purified water is directed via conduit 141 to and through the second portion of the first heat exchanger 121. The purified water is consequently heated by at least some of the latent heat of condensation and at least some of the sensible heat in the contaminated condensate. The heated purified water is then directed via conduit 142 to the second evaporation unit 140, where at least some of the heated purified water is evaporated, producing the second gaseous stream comprising water vapor. The second gaseous stream is discharged into the atmosphere. At least some of the latent heat and at least some of the sensible heat transferred into the purified water are accordingly also dissipated out of the system 100 together with the discharged second gaseous stream. The purified water that remains in the second evaporation unit 140 after evaporation ("residual purified water") has a temperature lower than the heated purified water received from the first heat exchanger 121.

In at least one application, at least some of the residual purified water may be recirculated via conduits 143,145 to conduit 142, where it is mixed with the heated purified water from the first heat exchanger 121. This purified water mixture is then directed to the second evaporation unit 140 for further evaporation. In at least another application, at least some of the residual purified water is mixed with the purified water directly or indirectly (as in FIG. 1) received from the biological treatment unit 130 and the purified water mixture is directed to the first heat exchanger 121 via conduit 141. The purified water mixture is heated in the first heat exchanger 121, and this heated mixture is then directed to the second evaporation unit 140 for further evaporation. When the total dissolved solids content in the residual purified water reaches a preset value, such as 30,000 mg/L, some of the residual purified water may be directed to the first evaporation unit 120 for further treatment or be blown down out of the system 100 via conduits 143,144.

In another example embodiment (not depicted in FIG. 1), the system 100 may comprise a heat transfer fluid circuit that operates in addition to or as an alternative to the first heat exchanger 121 and conduits 141,142 to transfer heat from the condenser 120 to the purified water. For example, the heat transfer fluid circuit may comprise piping manufactured from a heat-conductive material (e.g., titanium) through which a heat transfer fluid (e.g., ethylene glycol-water) is pumped. This piping may extend through the condenser 120 and the purified water in the second evaporation unit 140, such that the heat transfer fluid absorbs at least some latent and sensible heat from the contaminated condensate and transfers it to the purified water.

Figure 2:
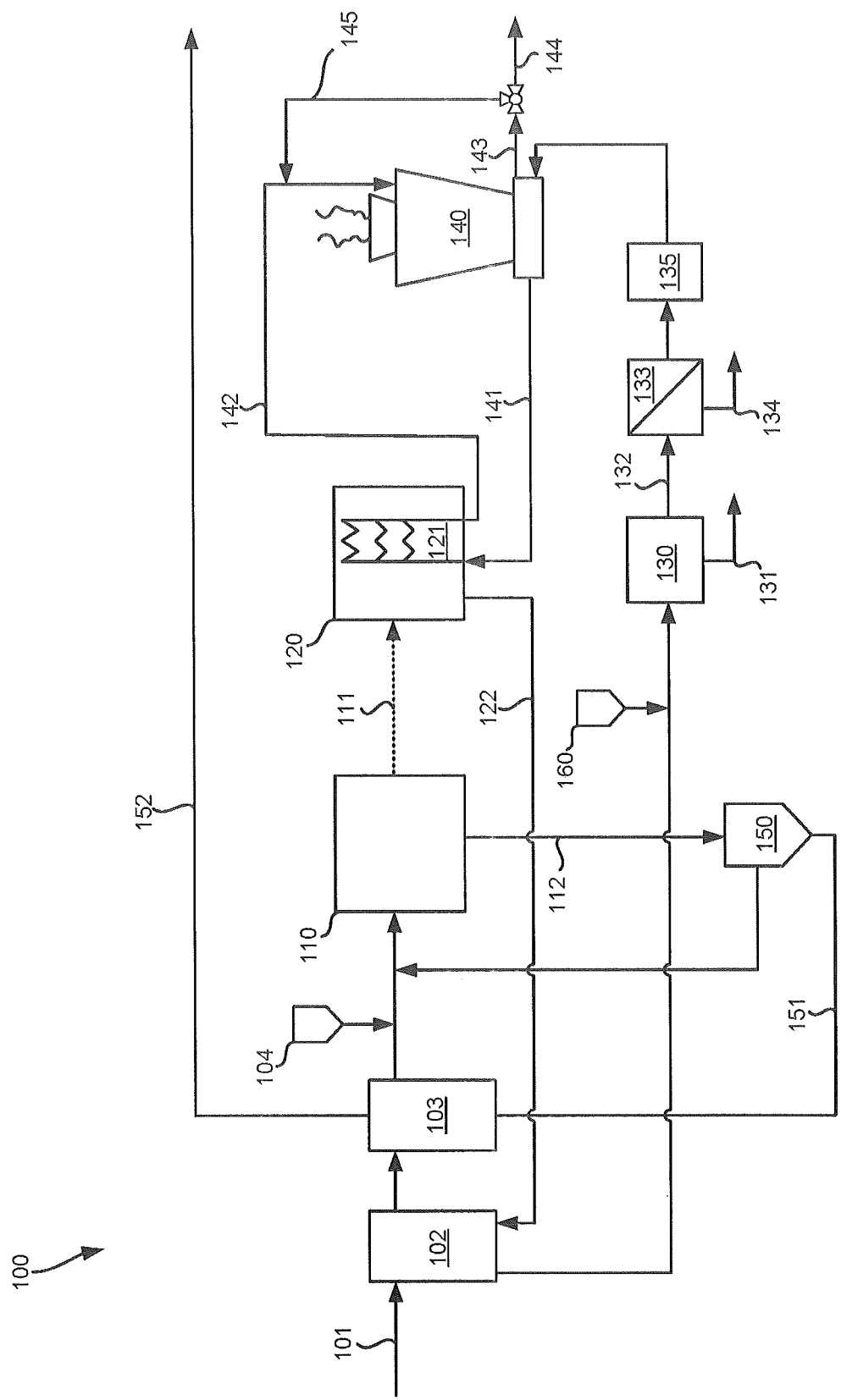

FIG. 2 is schematic illustration of another embodiment of the saltwater treatment system 200, which may be used to evaporatively dispose of a saltwater contaminated with volatile compounds. The system 200 comprises the system 100 of FIG. 1, and further comprises a second heat exchanger 102 and a third heat exchanger 103 positioned in series with and upstream of the first evaporation unit 110 to receive the saltwater upon entering the system 200 and to heat the saltwater as it travels to the first evaporation unit 110; an acid addition unit 104 fluidly coupled to the first evaporation unit 110; and an organic compound addition unit 160 fluidly coupled to the biological treatment unit 130.

In FIG. 2, the second heat exchanger 102 is fluidly coupled to the condenser 120 and the biological treatment unit 130 and operates to transfer some residual sensible heat in the contaminated condensate to the saltwater entering the system 200 via conduit 101. The temperature of the contaminated condensate exiting the second heat exchanger 102 is cooled below 40° C., in some example embodiments below 35° C., and in some additional example embodiments below 30° C. The cooled contaminated condensate is directed to the biological treatment unit 130. According to at least some example embodiments, the transferring of the latent heat and the sensible heat by the first heat exchanger 121 together with the transferring of the residual sensible heat by the second heat exchanger 102 keep the temperature of the contaminated condensate entering the biological treatment unit below 40° C.

The third heat exchanger 103 is fluidly coupled to the second heat exchanger 102 to receive the saltwater exiting the second heat exchanger 102 and to the solids management unit 150 via conduit 151 to receive blowdown brine. The third heat exchanger 103 operates to transfer residual heat in the blowdown brine to the saltwater, with the resulting heated saltwater being output to the first evaporation unit 110. After the third heat exchanger 103 transfers the residual heat from the blowdown brine, the blowdown brine is discharged via conduit 152 from the system 200.

Each of the second and third heat exchangers 102,103 comprises a first portion and a second portion thermally coupled to the first portion such that thermal energy can be transferred between the first and second portions. For example, the second and third heat exchangers 102,103 may each comprise a jacketed container manufactured from a heat-conductive material (e.g., titanium), with the first portion being the interior of the container and the second portion being the space between the container and the container's jacket. In the second heat exchanger 102, the saltwater entering the system 200 may contact the first portion and the contaminated condensate may contact the second portion; and in the third heat exchanger 103, the saltwater received from the second heat exchanger 102 may contact the first portion and the blowdown brine may contact the second portion.

In FIG. 2, the acid addition unit 104 is used to supply an acid to saltwater exiting the third heat exchanger 103 and prior to the saltwater entering the first evaporation unit 110. The acid may be, for example, hydrochloric acid, sulfuric acid, or sulfamic acid. The pH of the saltwater entering the first evaporation unit 110 is adjusted into a range of 3.5 to 7.0, and in at least some example embodiments into a range of 4.0 to 5.5. When the volatile compounds in the saltwater comprise ammonia and volatile organic compounds, the pH adjustment helps to prevent at least 85%, in at least some example embodiments at least 90%, and in at least some additional example embodiments at least 95%, of the ammonia-based volatile compounds in the saltwater from evaporating into the first gaseous stream. Less than 15% of the ammonia-based volatile compounds while at least 80% of the volatile organic compounds in the saltwater are evaporated into the first gaseous stream during the saltwater's evaporation in the first evaporation unit 110. As biological removal of ammonia is energy and cost intensive, only evaporating less than 15% of the ammonia-based volatile compounds in the saltwater into the first gaseous stream is cost-effective and conserves thermal energy for subsequent use by the biological treatment unit 130.

The organic compound addition unit 160 (e.g., a storage container filled with an organic compound) supplies an organic carbon compound, such as methanol, ethanol, sodium acetate, or ethylene glycol, to the biological treatment unit 130 as necessary or desirable to maintain a preset biodegradation capacity of the biological treatment unit 130. Adding organic compounds using the organic compound addition unit 160 may be done when the base level of organic volatile compounds in the contaminated condensate is insufficient to cause the microbes to maintain the preset level of biodegradation activity.

Figure 3:
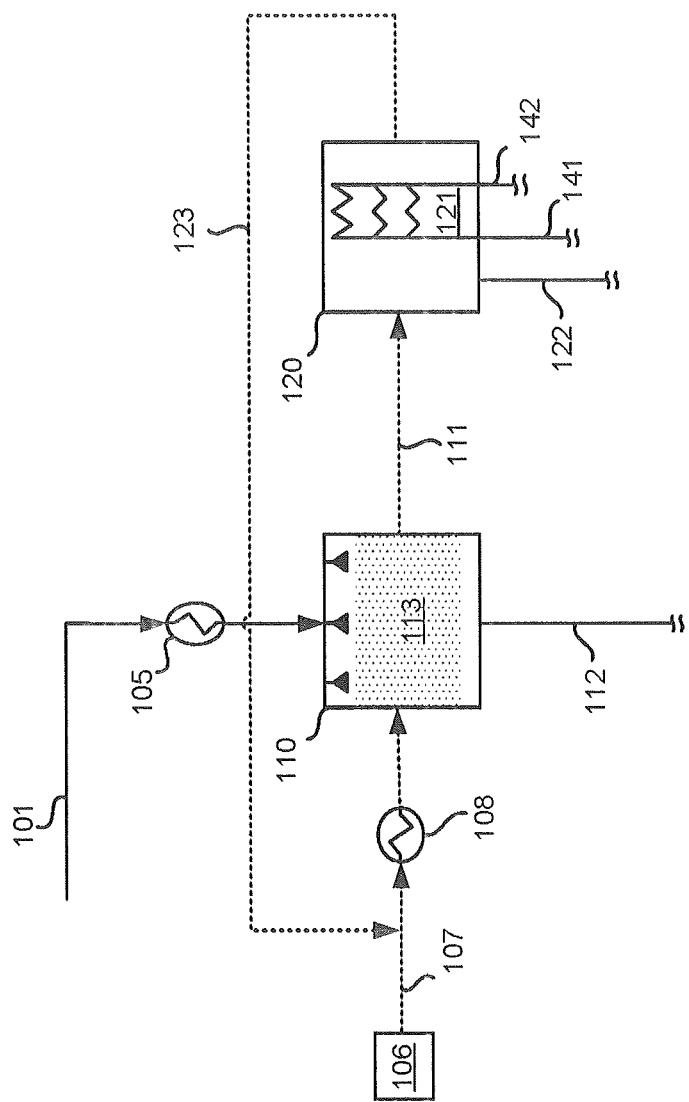
FIG. 3 is an example humidification-dehumidification desalination unit that may be used in the saltwater treatment system of FIGS. 1 and 2, according to another embodiment.

Referring now to FIG. 3, there is depicted a humidification-dehumidification desalination unit according to at least some example embodiments that may be used in the saltwater treatment systems 100,200 of FIGS. 1 and 2. In FIG. 3, the first evaporation unit 110 comprises a humidifier unit and the condenser 120 comprises a dehumidifier unit. A carrier gas source 106 is fluidly coupled to an inlet of the humidifier unit to supply via conduit 107 a carrier gas (e.g., air) to the humidifier unit. A first heating unit 105 is positioned upstream of the humidifier unit to receive the saltwater via conduit 101 and to heat the saltwater entering the humidifier unit. A second heating unit 108 is positioned upstream of the humidifier unit and downstream of the carrier gas source 106 to heat the carrier gas entering the humidifier unit.

In the embodiment shown in FIG. 3, the saltwater and the carrier gas are directed by applying a crossflow method into the humidifier unit. In at least some other embodiments (not depicted), the saltwater and the carrier gas may be directed by applying a countercurrent flow method into the humidifier unit. The carrier gas and the saltwater are in direct contact inside the humidifier unit, leading to evaporation of at least some of the saltwater into the carrier gas. The saltwater becomes the concentrated brine, which falls out of the humidifier unit and exits via conduit 112, and the carrier gas becomes the first gaseous stream comprising water vapor and gaseous volatile compounds resulting from the saltwater's evaporation.

The humidifier unit comprises a packing 113 to enlarge the direct contact area between the carrier gas and the saltwater in the humidifier unit. The packing 113 respectively provides surfaces and channels for the saltwater and the carrier gas at which to meet and through which to flow. In at least some example embodiments, the packing 113 is made from a material having a low surface wettability for the saltwater. Without being limited to a theory, a surface having low surface wettability helps to prevent any salt solids generated during the saltwater's evaporation from accumulating onto the surface and consequently from blocking channels through the packing 113. The surface of the packing material comprises any one or more of, or is selected from a group consisting of, ethylene-tetrafluoroethylene copolymer, fluorinated ethylene-propylene, perfluoroalkoxy polymer, and polytetrafluoroethylene.

The first gaseous stream exiting from the humidifier unit is directed via conduit 111 to the dehumidifier unit. At least some of the water vapor and at least some of the volatile compounds in the first gaseous stream are condensed in the dehumidifier unit to produce an at least partially dehumidified carrier gas and the contaminated condensate. In at least some applications, at least some of the at least partially dehumidified carrier gas is circulated via a gas circulation conduit 123 from an outlet of the dehumidifier unit back to an inlet of the humidifier unit and is reused as the carrier gas for continuous saltwater evaporation in the humidifier unit. While the dehumidified carrier gas is being recycled in this way, the carrier gas source may in at least some example embodiments be turned off partially or completely. Most of the volatile compounds in the first gaseous stream are condensed into the contaminated condensate. A small portion of the volatile compounds may not be condensed and thus be retained in the at least partially dehumidified carrier gas. As the at least partially dehumidified carrier gas is reused by circulating it back to the humidifier unit, substantially no volatile compounds from the saltwater need be released into the atmosphere during the saltwater's evaporation in the humidifier unit and the condensation of the first gaseous stream in the dehumidifier unit. The humidifier unit and the dehumidifier unit may require maintenance from time-to-time (e.g., at a preset time or when operation of the system 100,200 is interrupted). The at least partially dehumidified carrier gas may be treated by a third activated carbon unit or a thermal oxidizer (not shown in FIG. 3) before being discharged into the atmosphere when the maintenance is performed.

As used herein, two components are "in fluid communication" or are "fluidly coupled" to each other when they are directly or indirectly connected such that a fluid in the form of a gas and/or liquid can be transferred between them. Two components being in fluid communication or fluidly coupled to each other does not prevent them from also transferring solids between each other.

As used herein, two components are "thermally coupled" to each other when they are directly or indirectly physically connected such that thermal energy (i.e., heat) can be transferred between gases or liquids flowing through the components. In at least some example embodiments, the heat transfer is controllable (e.g., valving may be used to control the flow of the gas or liquid used for the heat transfer, thereby adjusting the amount of heat transferred between the components).

Additionally, the term "and/or" when used in conjunction with multiple items means any one or more of those items. For example, "A, B and/or C" means "any one or more of A, B, and C".

It is contemplated that any part of any aspect or embodiment discussed in this specification can be implemented or combined with any part of any other aspect or embodiment discussed in this specification.

One or more example embodiments have been described by way of illustration only. This description is presented for purposes of illustration and description but is not intended to be exhaustive or limited to the form disclosed. It will be apparent to persons skilled in the art that a number of variations and modifications can be made without departing from the scope of the claims.

The invention claimed is:

1. A process for treating a saltwater containing volatile compounds, the process comprising:
   (a) evaporating the saltwater to produce a concentrated brine having a salt concentration higher than the saltwater and a first gaseous stream comprising water vapor and gaseous volatile compounds;
   (b) condensing at least some of the water vapor and gaseous volatile compounds to produce a contaminated condensate and to release a latent heat of condensation;
   (c) biologically removing at least some of the volatile compounds from the contaminated condensate to produce a purified water with a lower concentration of the volatile compounds than the contaminated condensate;
   (d) heating the purified water using at least some of the latent heat; and
   (e) evaporating at least some of the heated purified water to produce a second gaseous stream.

2. The process of claim 1, further comprising discharging into the atmosphere the second gaseous stream.

3. The process of claim 2, further comprising filtering the purified water, wherein the filtering comprises applying at least one of microfiltration and ultrafiltration without applying reverse osmosis.

4. The process of claim 3, further comprising polishing the purified water using an activated carbon unit.

5. The process of claim 2, further comprising heating at least one of the saltwater and the purified water by transferring at least some sensible heat from the contaminated condensate to the at least one of the saltwater and the purified water such that the contaminated condensate is cooled to a temperature below 40° C. before the at least some of the volatile compounds are biologically removed from the contaminated condensate.

6. The process of claim 5, wherein at least some of the sensible heat and latent heat is used to heat and evaporate at least some of the purified water.

7. The process of claim 2, wherein the volatile compounds comprise volatile organic compounds and ammonia.

8. The process of claim 7, wherein the evaporating to produce the first gaseous stream evaporates less than 15% of the ammonia and at least 80% of the volatile organic compounds of the saltwater into the first gaseous stream.

9. The process of claim 8, further comprising adjusting the pH of the saltwater such that the pH is in a range of 3.5 to 7.0 during the evaporating of the saltwater.

10. The process of claim 9, further comprising maintaining a preset biodegradation capacity of a biological treatment unit used to biologically remove the volatile compounds by supplying an organic compound to the biological treatment unit.

11. The process of claim 10, wherein the biological removing of the volatile compounds is performed aerobically.

12. The process of claim 2, wherein the evaporating of the saltwater is performed using a humidifier unit and the condensing is performed using a dehumidifier unit.

13. The process of claim 12, further comprising supplying a carrier gas to the humidifier unit while the humidifier unit is used to evaporate the saltwater to produce the first gaseous stream.

14. The process of claim 13, wherein the condensing of the first gaseous stream in the dehumidifier unit produces an at least partially dehumidified carrier gas.

15. The process of claim 14, further comprising re-using at least some of the at least partially dehumidified carrier gas produced by the dehumidifier unit as the carrier gas for the humidifier unit.

16. A system for treating a saltwater containing volatile compounds, the system comprising:
   (a) a first evaporation unit to receive the saltwater and configured to evaporate the saltwater to produce a concentrated brine having a salt concentration higher than the saltwater and a first gaseous stream comprising water vapor and gaseous volatile compounds;
   (b) a condenser fluidly coupled to the first evaporation unit to receive the first gaseous stream and configured to condense at least some of the water vapor and gaseous volatile compounds to produce a contaminated condensate and to release a latent heat of condensation;
   (c) a biological treatment unit fluidly coupled to the condenser to receive the contaminated condensate and configured to remove at least some of the volatile compounds from the contaminated condensate to produce a purified water with a lower concentration of the volatile compounds than the contaminated condensate; and
   (d) a second evaporation unit fluidly coupled to the biological treatment unit to receive the purified water and thermally coupled to the condenser such that at least some of the latent heat is transferred into and used to evaporate at least some of the purified water to produce a second gaseous stream.

17. The system of claim 16, wherein the condenser comprises a first heat exchanger to which the second evaporation unit is thermally coupled.

18. The system of claim 17, wherein the biological treatment unit comprises at least one of an activated sludge reactor, a moving bed biofilm reactor, and a membrane bioreactor.

19. The system of claim 17, wherein the second evaporation unit is an evaporative cooling tower.

20. The system of claim 19, further comprising a second heat exchanger fluidly coupled to the first evaporation unit and the condenser, wherein the second heat exchanger is configured to receive the saltwater and the contaminated condensate and transfer sensible heat from the contaminated condensate to the saltwater such that the contaminated condensate is cooled to a temperature below 40° C. prior to entering the biological treatment unit.

21. The system of claim 17, further comprising a solids management unit fluidly coupled to the first evaporation unit to receive the concentrated brine and configured to separate from the concentrated brine at least some solids generated during evaporating of the saltwater.

22. The system of claim 21, further comprising a filter unit fluidly coupled to the biological treatment unit and the second evaporation unit and configured to filter the purified water entering the second evaporation unit by applying at least one of microfiltration and ultrafiltration without applying reverse osmosis unit.

23. The system of claim 22, further comprising an activated carbon unit fluidly coupled to the filter unit and the second evaporation unit and configured to remove residual volatile organic compounds in the purified water entering the second evaporation unit.

24. The system of claim 17, wherein the first evaporation unit and the condenser comprise a humidifier unit and a dehumidifier unit, respectively.

25. The system of claim 24, wherein the humidifier unit comprises a packing with a surface material comprising one or more of ethylene-tetrafluoroethylene copolymer, fluorinated ethylene-propylene, perfluoroalkoxy polymer, and polytetrafluoroethylene.

26. The system of claim 24, wherein the humidifier unit is configured to receive a carrier gas and to facilitate evaporation of the saltwater into the carrier gas to produce the first gaseous stream.

27. The system of claim 26, wherein the dehumidifier unit is configured to condense at least some water and at least some of the volatile compounds in the first gaseous stream to produce an at least partially dehumidified carrier gas.

28. The system of claim 27, further comprising a gas circulation conduit fluidly coupling an outlet of the dehumidifier unit and an inlet of the humidifier unit for circulating the at least partially dehumidified carrier gas from the dehumidifier unit to the humidifier unit for re-use as the carrier gas.

* * * * *